W. B. LEHMKUHL.
ADJUSTABLE SUPPORTING APPARATUS.
APPLICATION FILED JULY 13, 1916.
1,255,185.
Patented Feb. 5, 1918.
2 SHEETS—SHEET 2.
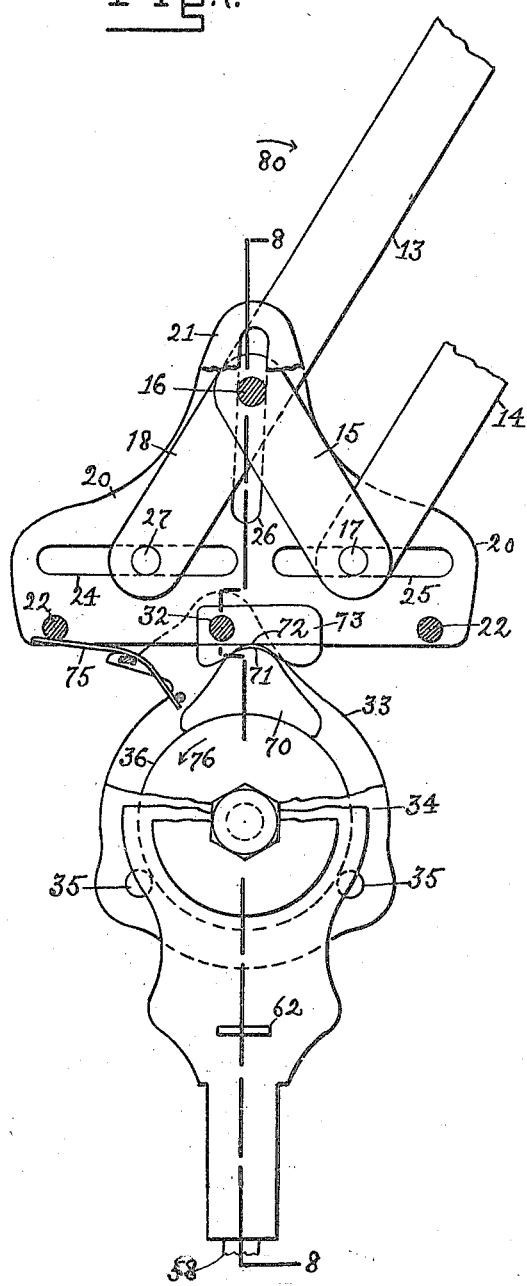
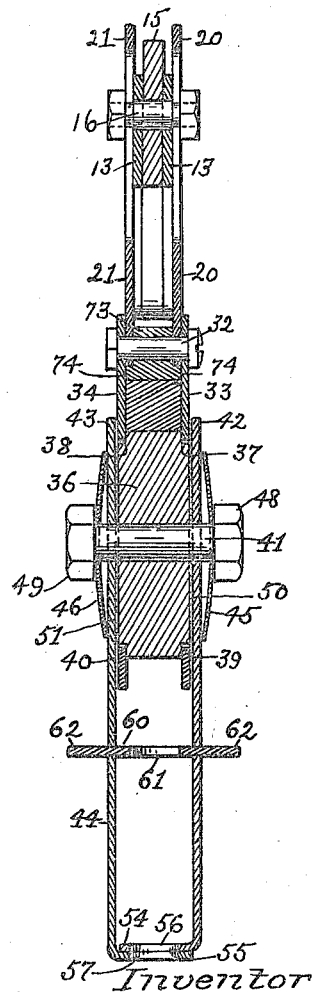
Inventor
William B. Lehmkuhl
By Jas. H. Churchill
Attorney

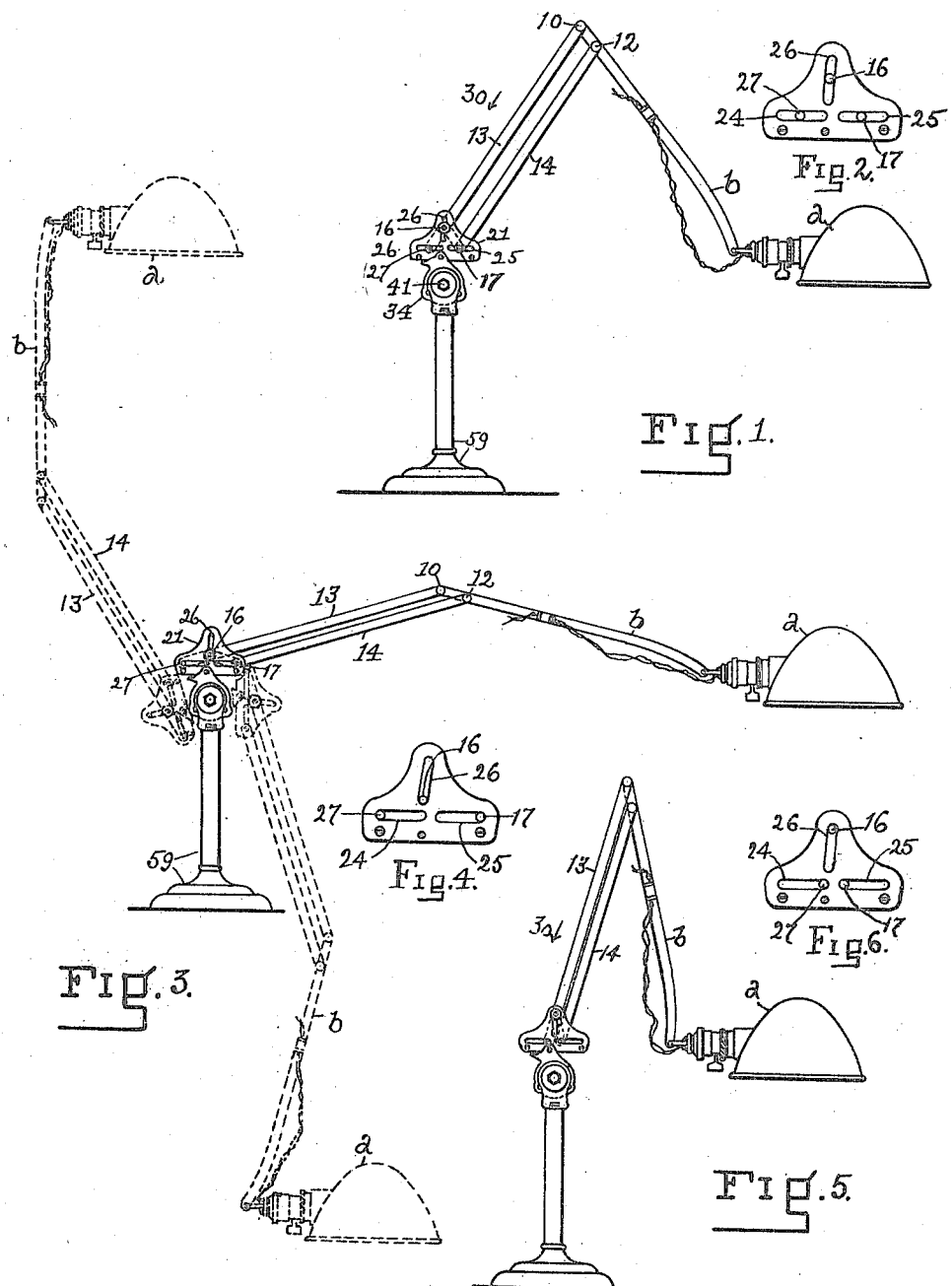

UNITED STATES PATENT OFFICE.

WILLIAM B. LEHMKUHL, OF CAMBRIDGE, MASSACHUSETTS.

ADJUSTABLE SUPPORTING APPARATUS.

1,255,185.  Specification of Letters Patent.  Patented Feb. 5, 1918.

Application filed July 13, 1916. Serial No. 109,170.

*To all whom it may concern:*

Be it known that I, WILLIAM B. LEHMKUHL, a citizen of the United States, and a resident of Cambridge, in the county of Middlesex and State of Massachusetts, have invented an Improvement in Adjustable Supporting Apparatus, of which the following description, in connection with the accompanying drawings, is a specification, like characters on the drawings representing like parts.

This invention relates to an adjustable support, which is capable of being used with various objects, but which is especially adapted among other uses to be employed with an electric lamp, telephone or other object, by means of which the said object may be adjusted into different positions of use, as will be described.

The invention has for its object to provide a simple, inexpensive and efficient adjustable supporting apparatus, with which objects of different weight may be supported without change in the apparatus, and which is frictionally retained in its adjusted position, as will be described.

To this end, the apparatus is provided with a member having a plurality of guideways, two of which are arranged in substantially the same horizontal plane, and a third in a substantially vertical plane, and in which move pins or other devices carried by toggle arms or levers, the center pin of the toggle being movable in the substantially vertical guideway.

The toggle levers are pivotally connected with an arm or device to which the object to be supported is attached, as will be described.

The member provided with the guideways referred to, may be stationary or it may be rotatably mounted, and provision is made for maintaining it in its adjusted position, as will be described.

These and other features of this invention will be pointed out in the claims at the end of this specification.

Figure 1 is an elevation of one form of apparatus embodying this invention.

Fig. 2, a detail to be referred to.

Fig. 3, an elevation of the apparatus in its extended position.

Fig. 4, a detail to be referred to.

Fig. 5, an elevation of the apparatus in its closed position.

Fig. 6, a detail to be referred to.

Fig. 7, an enlarged detail of parts of the apparatus shown in Fig. 1, and

Fig. 8, a section on the line 8—8, Fig. 7.

Referring to the drawing, $a$ represents the object to be supported, which is shown as an electric lamp of any suitable or known construction, which is pivotally attached to an arm or lever $b$, pivotally connected at 10—12, with one end of parallel links 13, 14, which are joined at their other ends by a link 15 (see Fig. 7), pivotally connected at one end with the link 13 by the pin 16, and at its other end to the link 14 by the pin 17. The link 15 coöperates with the link 13 to form a toggle, with the pin 16 as a center, the arm 18 of the link 13 constituting one member of the toggle and the link 15 the other member thereof. The toggle is connected in sliding engagement with a supporting member consisting, in the present instance, of two parallel plates 20, 21, spaced apart a sufficient distance to receive between them the toggle members and the end of the link 14, but which are fastened together by screws 22 or other suitable devices.

Each plate 20, 21 is provided as shown with substantially horizontal slots 24, 25, and a substantially vertical slot 26, located substantially central with relation to the slots 24, 25, so as to have the arrangement of an inverted T. The toggle member 18 is provided with a pin 27, which is extended into the horizontal slot 24 of the plates 20, 21, and is movable therein, and the pin 17 of the toggle member 15 is extended into the horizontal slot 25 and is movable therein, while the center pin 16 of the toggle is extended into the substantially vertical slot 26 and is movable in it. The pins 27, 17, are preferably of a diameter substantially equal to the width of the slots 24, 25, so as to engage the walls of said slots and thereby frictionally hold the toggle and the parts connected with it, in the desired or adjusted position. The arrangement of the slots and pins permits the arm *b* to be moved toward and from the slotted supporting member 20, 21, and the lamp *a* or other object to be adjusted with relation to said member, and to be held in its adjusted position by the friction between the pins and the slotted supporting member, which arrangement enables the apparatus to be employed with objects of different weights without change in the apparatus.

In Fig. 5, the apparatus is shown in its folded-up or innermost position, and the pins 16, 17, 27, are at the inner ends of the slots 26, 25, 24, as represented in Fig. 6.

In Fig. 3, the apparatus is shown by full lines in its extreme outward position, and the pins 16, 17, 27 are at the outer ends of the slots 26, 25, 24, while in Fig. 1, the apparatus is shown in a position between the two extreme positions, and the pins 16, 17, 27 are located between the ends of the slots 26, 25, 24.

The adjustment of the apparatus is effected by merely pulling or pushing upon the lever or arm *b*, which can be effected with little effort.

When the lever or arm *b* is pulled upon, the said lever turns on the pin 12 as a pivot, and the link 13 is moved downward or in the direction of the arrow 30, Fig. 1, which causes the center pin 16 to be moved downward in the inclined or substantially vertical slot 26, and the link 13 is turned on the center pin 16 and the lower end of the arm 18 is moved outwardly. On the downward movement of the center pin 16, the upper end of the link 15 is moved downwardly and its lower end is forced outwardly. In this manner, the lamp can be moved outwardly into the position desired. When the arm *b* is pushed inwardly from the position shown in Fig. 3, the center pin 16 travels up in its slot 26, and the pins 27, 17, travel inwardly and toward each other. The supporting apparatus is held in the different positions into which it is adjusted by the frictional engagement of the pins 27, 17, 16, with the walls of the slots in which they move, and this frictional engagement is sufficient to hold the apparatus in its adjusted position, irrespective of the weight, within limits, of the lamp *a* or other object being supported.

As a result, the apparatus is capable of being used without change with objects of different weight, and the use of means for counterbalancing the weight of the object to be supported is dispensed with, and the necessity of adjusting the apparatus for objects of different weight is avoided.

The supporting member 20, 21, in some instances may be fixed or rendered stationary, and the apparatus in such case would have an in and out adjustment. On the other hand, the supporting member 20, 21, may be mounted so as to be movable in different directions, and in the present instance, I have shown one method of movably mounting the supporting member, which may be preferred by me.

In the present instance, the supporting member 20, 21, is pivotally connected by a pin 32 to a rotatable carrier or frame comprising side plates 33, 34, which are spaced apart and fastened together by rivets 35 or otherwise, and the upper ends of which straddle the slotted member 20, 21.

The plates 33, 34, are mounted to turn on a hub or disk 36 (see Fig. 8), provided at its opposite sides with annular shoulders 37, 38, which extend through circular openings 39, 40 in the plates 33, 34, and the said disk is mounted on a bolt 41 between the arms 42, 43, of a forked device 44, and is frictionally held from rotating on the bolt 41 by spring washers 45, 46, mounted on the bolt 41 and engaging the outer surfaces of the arms 42, 43, when compressed by the head 48 and nut 49 of the said bolt. The arms 42, 43, of the fork are pressed against washers 50, 51, mounted on the bolt and practically forming part of the disk 36. The forked device 44 may be stationary or it may be mounted upon a suitable base 52 so as to turn thereon in a circular path.

In the present instance, the forked device 44 is made of sheet metal plates, which are provided with inturned lugs or ears 54, 55, which overlap and are provided with holes or openings 56, 57, for the passage of a suitable center pin 58, attached to or forming part of the case 59. The side arms 42, 43, are spaced apart, as herein shown by a sheet metal cross bar 60, having a hole 61 for the passage of the center pin 58 and provided with ears 62, which extend through suitable slots in the side arms 42, 43.

It will thus be seen that the supporting device herein shown is capable of being turned in a horizontal circular path upon the base 59, and in a vertical circular path upon the disk 36 as a center, and provision is made for securing the slotted member 20, 21, and its carrier or supporting frame 33, 34, in the adjusted positions into which they are moved about the disk 36 as a center. To this end, the disk 36 has coöperating with it a clutch shoe or member 70 (see Fig. 7), which is provided with a curved upper end 71 to fit a curved recess 72 in a block 73 mounted on the pin 32. The block 73 is provided with side flanges 74 (see Fig. 8), which extend under the side plates 20, 21, and said block is pressed down on the shoe 70 by a spring 75, which is practically anchored to the frame 33, 34, and has its outer end engaged with a pin 22 of the slotted member 20, 21. The clutch shoe 70 is capable of being moved freely in the direction of the arrow 76 Fig. 7, with the slotted member 20, 21, and its carrier 33, 34, which latter turns on the disk 36 as a center, thereby permitting the apparatus to be turned from the lower dotted line position, shown in Fig. 3, up into the elevated dotted line position, and the apparatus is held in said positions and any intermediate position, as, for instance, the one represented by full lines, by the shoe 70 engaging the disk or wheel 36, which latter is practically stationary, as it is held from movement by the pressure of the spring washers 45, 46, until such time as it is desired to move the apparatus from the position shown by the upright dotted lines to the lower dotted line position or any intermediate position.

When the operator turns the member 20, 21, toward the right or in the direction of the arrow 80, Fig. 7, the block 73 forces the shoe 70 into engagement with the disk or wheel 36, thereby clutching the member 20, 21, and its carrier 33, 34, to the disk or wheel 36 so as to cause the latter to turn on the bolt 41 as a center, the pull of the operator on the arm b being sufficient to overcome the pressure of the spring washers. When the disk 36 has been turned into the desired position, it is held there by the pressure of the spring washers, and the slotted member 20, 21, is then practically stationary, being held by the weight of the lamp a, which can then be adjusted in or out as above described.

It may be preferred to mount the member 20, 21, so as to be capable of being turned in a vertical circular path and also in a horizontal circular path, but it is not desired to limit the invention in this respect, as the said member may be affixed to a stationary support, as, for instance, a wall, desk or other object, and in such case, the lamp is capable of being adjusted in and out.

I have herein shown one construction embodying the invention, but it is not desired to limit the invention to the particular construction shown.

Claims.

1. In an apparatus of the character described, in combination, a member provided with substantially horizontal slots and with a substantially vertical slot, substantially parallel links having devices movable in said horizontal slots, and one of said links having a device movable in said vertical slot, a link connecting the device movable in the vertical slot with the device carried by the link which is parallel with the link carrying the device movable in the vertical slot, and an arm pivotally connected with the free ends of the substantially parallel links and to which the object to be supported is connected.

2. In an apparatus of the character described, in combination, a member provided with substantially horizontal slots and with a substantially vertical slot, a carrier to which said member is pivoted, a disk on which said carrier is mounted to turn thereon, means for clutching said member and carrier to said disk, a support for said disk, means for frictionally engaging said disk to hold it from rotating, a toggle movable in said slots, and means for moving said toggle.

3. In an apparatus of the character described, in combination, a member comprising substantially parallel plates spaced apart and provided with substantially horizontal guideways and with a substantially vertical guideway, a toggle located between said plates and having devices movable in said guideways, an arm for supporting an object, and links connecting said arm with said toggle.

4. In an apparatus of the character described, in combination, a supporting member, a toggle provided at its center and ends with devices which are in sliding engagement with said supporting member, means for operating said toggle to move the same on said supporting member, and a rotatable carrier for said supporting member.

5. In an apparatus of the character described, in combination, a supporting member, a toggle provided at its center and ends with devices which are in sliding engagement with said supporting member, means for operating said toggle to move the same on said supporting member, and a carrier for said supporting member rotatable in a substantially vertical plane.

6. In an apparatus of the character described, in combination, a supporting member, a toggle provided at its center and ends with devices which are in sliding engagement with said supporting member, means for operating said toggle to move the same on said supporting member, a carrier for said supporting member rotatable in a substantially vertical plane, and a support for said carrier rotatable in a substantially horizontal plane.

7. In an apparatus of the character described, in combination, a supporting member, a carrier for said supporting member, a disk on which said carrier is mounted to turn, a clutch member coöperating with said disk, and a device carried by said supporting member and coöperating with said clutch member to cause the latter to engage said disk.

8. In an apparatus of the character described, in combination, a supporting member, a carrier for said supporting member, a disk on which said carrier is mounted to turn, a clutch member coöperating with said disk, a block carried by said supporting member and provided with a recess into which said clutch member extends.

9. In an apparatus of the character described, in combination, a supporting member, a toggle having the ends and center of its members in sliding engagement with said supporting member, a movable device to which an object to be supported is connected, and substantially parallel links connecting said toggle members with said movable device.

In testimony whereof, I have signed my name to this specification.

WILLIAM B. LEHMKUHL.

Copies of this patent may be obtained for five cents each, by addressing the "Commissioner of Patents, Washington, D. C."